United States Patent [19]
Key et al.

[11] Patent Number: 6,119,215
[45] Date of Patent: Sep. 12, 2000

[54] SYNCHRONIZATION AND CONTROL SYSTEM FOR AN ARRAYED PROCESSING ENGINE

[75] Inventors: Kenneth Michael Key; Michael L. Wright, both of Raleigh, N.C.; Darren Kerr, Palo Alto, Calif.; William E. Jennings, Cary, N.C.

[73] Assignee: Cisco Technology, Inc., San Josa, Calif.

[21] Appl. No.: 09/106,246

[22] Filed: Jun. 29, 1998

[51] Int. Cl.[7] .................................................. G06F 15/00
[52] U.S. Cl. ............................................ 712/19; 711/153
[58] Field of Search ........................ 712/10–22; 711/153

[56] References Cited

U.S. PATENT DOCUMENTS

| | | | |
|---|---|---|---|
| 4,590,554 | 5/1986 | Glazer et al. | 364/200 |
| 4,598,400 | 7/1986 | Hillis | 370/60 |
| 4,709,327 | 11/1987 | Hillis et al. | 364/200 |
| 4,773,038 | 9/1988 | Hillis et al. | 364/900 |
| 4,791,641 | 12/1988 | Hillis | 371/38 |
| 4,805,091 | 2/1989 | Thiel et al. | 364/200 |
| 4,809,202 | 2/1989 | Wolfram | 364/578 |
| 4,870,568 | 9/1989 | Kahle et al. | 364/200 |
| 4,922,486 | 5/1990 | Lidinsky et al. | 370/60 |
| 4,965,717 | 10/1990 | Cutts, Jr. et al. | 364/200 |
| 4,993,028 | 2/1991 | Hillis | 371/39.1 |
| 5,070,446 | 12/1991 | Salem | 395/500 |
| 5,111,198 | 5/1992 | Kuszmaul | 340/825.52 |
| 5,113,510 | 5/1992 | Hillis | 395/425 |
| 5,117,420 | 5/1992 | Hillis et al. | 370/60 |
| 5,129,077 | 7/1992 | Hillis | 395/500 |
| 5,148,547 | 9/1992 | Kahle et al. | 395/800 |
| 5,151,996 | 9/1992 | Hillis | 395/800 |
| 5,157,663 | 10/1992 | Major et al. | 371/9.1 |
| 5,175,865 | 12/1992 | Hillis | 395/800 |
| 5,212,773 | 5/1993 | Hillis | 395/200 |
| 5,222,216 | 6/1993 | Parish et al. | 395/275 |
| 5,222,237 | 6/1993 | Hillis | 395/650 |
| 5,247,613 | 9/1993 | Bromley | 395/200 |
| 5,247,694 | 9/1993 | Dahl | 395/800 |
| 5,255,291 | 10/1993 | Holden et al. | 375/111 |
| 5,261,105 | 11/1993 | Potter et al. | 395/725 |
| 5,265,207 | 11/1993 | Zak et al. | 395/200 |
| 5,274,631 | 12/1993 | Bhardwaj | 370/60 |
| 5,289,156 | 2/1994 | Ganmukhi | 340/146.2 |
| 5,295,258 | 3/1994 | Jewett et al. | 395/575 |
| 5,301,310 | 4/1994 | Isman et al. | 395/575 |
| 5,317,726 | 5/1994 | Horst | 395/575 |
| 5,355,492 | 10/1994 | Frankel et al. | 395/700 |
| 5,357,612 | 10/1994 | Alaiwan | 395/200 |
| 5,361,363 | 11/1994 | Wells et al. | 395/800 |
| 5,367,692 | 11/1994 | Edelman | 395/800 |
| 5,388,214 | 2/1995 | Leiserson et al. | 395/200 |
| 5,388,262 | 2/1995 | Hillis | 395/650 |
| 5,390,298 | 2/1995 | Kuszmaul et al. | 395/200 |
| 5,404,296 | 4/1995 | Moorhead | 364/421 |
| 5,404,562 | 4/1995 | Heller et al. | 395/800 |
| 5,455,932 | 10/1995 | Major et al. | 395/489 |
| 5,485,627 | 1/1996 | Hillis | 395/800 |
| 5,530,809 | 6/1996 | Doulas et al. | 395/200.2 |
| 5,535,408 | 7/1996 | Hillis | 395/800 |
| 5,561,669 | 10/1996 | Lenney et al. | 370/60.1 |
| 5,617,538 | 4/1997 | Heller | 395/200.02 |
| 5,621,885 | 4/1997 | Del Vigna, Jr. | 395/182.11 |
| 5,627,965 | 5/1997 | Liddell et al. | 395/185.01 |
| 5,673,423 | 9/1997 | Hillis | 395/553 |
| 5,710,814 | 1/1998 | Klemba et al. | 380/9 |
| 5,742,604 | 4/1998 | Edsall et al. | 370/401 |
| 5,751,955 | 5/1998 | Sonnier et al. | 395/200.19 |
| 5,764,636 | 6/1998 | Edsall | 370/401 |
| 5,787,255 | 7/1998 | Parlan et al. | 395/200.63 |
| 5,838,915 | 11/1998 | Klausmeier et al. | 395/200.45 |

*Primary Examiner*—John A. Follansbee
*Attorney, Agent, or Firm*—Cesari and McKenna, LLP

[57] ABSTRACT

A synchronization and control system for an arrayed processing engine of an intermediate network station comprises sequencing circuitry that controls the processing engine. The processing engine generally includes a plurality of processing element stages arrayed as parallel pipelines. The control system further includes an input header buffer (IHB) and an output header buffer (OHB), the latter comprising circuitry for receiving current transient data processed by the pipelines and for decoding control signals to determine a destination for the processed data. One destination is a feedback path that couples the OHB to the IHB and returns the processed data to the IHB for immediate loading into an available pipeline.

20 Claims, 10 Drawing Sheets

SYNCHRONIZATION AND CONTROL SYSTEM FOR AN ARRAYED PROCESSING ENGINE

CROSS-REFERENCE TO RELATED APPLICATIONS

This invention is related to the following copending U.S. patent applications:

U.S. patent application Ser. No. 09/106,478, titled, PROGRAMMABLE ARRAYED PROCESSING ENGINE ARCHITECTURE FOR A NETWORK SWITCH;

U.S. patent application Ser. No. 09/106,436, titled, ARCHITECTURE FOR A PROCESSOR COMPLEX OF AN ARRAYED PIPELINED PROCESSING ENGINE; and U.S. patent application Ser. No. 09/106,244, titled, SYSTEM FOR CONTEXT SWITCHING BETWEEN PROCESSING ELEMENTS IN A PIPELINE OF PROCESSING ELEMENTS, each of which was filed on even date herewith and assigned to the assignee of the present invention.

FIELD OF THE INVENTION

The present invention relates to computer networks and, in particular, to a control system for sequencing an arrayed processing engine of a network switch.

BACKGROUND OF THE INVENTION

Computer architecture generally defines the functional operation, including the flow of information and control, among individual hardware units of a computer. One such hardware unit is the processor or processing engine which contains arithmetic and logic processing circuits organized as a set of data paths. In some implementations, the data path circuits may be configured as a central processing unit (CPU) having operations which are defined by a set of instructions. The instructions are typically stored in an instruction memory and specify a set of hardware functions that are available on the CPU.

A high-performance computer may be realized by using a number of identical CPUs or processors to perform certain tasks in parallel. For a purely parallel multiprocessor architecture, each processor may have shared or private access to non-transient data, such as program instructions (e.g., algorithms) stored in a memory coupled to the processor. Access to an external memory is generally inefficient because the execution capability of each processor is substantially faster than its external interface capability; as a result, the processor often idles while waiting for the accessed data. Moreover, scheduling of external accesses to a shared memory is cumbersome because the processors may be executing different portions of the program. On the other hand, providing each processor with private access to the entire program results in inefficient use of its internal instruction memory.

In an alternative implementation, the data paths may be configured as a pipeline having a plurality of processor stages. This configuration conserves internal memory space since each processor executes only a small portion of the program algorithm. A drawback, however, is the difficulty in apportioning the algorithm into many different stages of equivalent duration. Another drawback of the typical pipeline is the overhead incurred in transferring transient "context" data from one processor to the next in a high-bandwidth application.

One example of such a high-bandwith application involves the area of data communications and, in particular, the use of a parallel, multiprocessor architecture as the processing engine for an intermediate network station. The intermediate station interconnects communication links and subnetworks of a computer network to enable the exchange of data between two or more software entities executing on hardware platforms, such as end stations. The stations typically communicate by exchanging discrete packets or frames of data according to predefined protocols, such as the Transmission Control Protocol/Internet Protocol (TCP/IP), the Internet Packet Exchange (IPX) protocol, the AppleTalk protocol or the DECNet protocol. In this context, a protocol consists of a set of rules defining how the stations interact with each other.

A router is an intermediate station that implements network services such as route processing, path determination and path switching functions. The route processing function determines the type of routing needed for a packet, whereas the path switching function allows a router to accept a frame on one interface and forward it on a second interface. The path determination, or forwarding decision, function selects the most appropriate interface for forwarding the frame. A switch is also an intermediate station that provides the basic functions of a bridge including filtering of data traffic by medium access control (MAC) address, "learning" of a MAC address based upon a source MAC address of a frame and forwarding of the frame based upon a destination MAC address. Modem switches further provide the path switching and forwarding decision capabilities of a router. Each station includes high-speed media interfaces for a wide range of communication links and subnetworks.

The hardware and software components of these stations generally comprise a communications network and their interconnections are defined by an underlying architecture. Modern communications network architectures are typically organized as a series of hardware and software levels or "layers" within each station. These layers interact to format data for transfer between, e.g., a source station and a destination station communicating over the internetwork. Predetermined services are performed on the data as it passes through each layer and the layers communicate with each other by means of the predefined protocols. Examples of communications architectures include the IPX communications architecture and, as described below, the Internet communications architecture.

The Internet architecture is represented by four layers which are termed, in ascending interfacing order, the network interface, internetwork, transport and application layers. These layers are arranged to form a protocol stack in each communicating station of the network. The lower layers of the stack provide internetworking services and the upper layers collectively provide common network application services. For example, the network interface layer comprises physical and data link sublayers that define a flexible network architecture oriented to the implementation of local area networks (LANs). Specifically, the physical layer is concerned with the actual transmission of signals across the communication medium and defines the types of cabling, plugs and connectors used in connection with the medium. The data link layer ("layer 2") is responsible for transmission of data from one station to another and may be further divided into two sublayers: logical link control (LLC) and MAC sublayers.

The MAC sublayer is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link MAC address. This MAC address is unique for each station interfacing to a LAN. The LLC sublayer manages communications between devices over a single link of the internetwork.

The primary network layer protocol of the Internet architecture is the Internet protocol (IP) contained within the internetwork layer ("layer 3"). IP is a network protocol that provides internetwork routing and relies on transport protocols for end-to-end reliability. An example of such a transport protocol is the Transmission Control Protocol (TCP) contained within the transport layer. The term TCP/IP is commonly used to refer to the Internet architecture. Protocol stacks and the TCP/IP reference model are well-known and are, for example, described in *Computer Networks* by Andrew S. Tanenbaum, printed by Prentice Hall PTR, Upper Saddle River, N.J., 1996.

Data transmission over the network therefore consists of generating data in, e.g., a sending process executing on the source station, passing that data to the application layer and down through the layers of the protocol stack where the data are sequentially formatted as a frame for delivery over the medium as bits. Those frame bits are then transmitted over the medium to a protocol stack of the destination station where they are passed up that stack to a receiving process. Although actual data transmission occurs vertically through the stacks, each layer is programmed as though such transmission were horizontal. That is, each layer in the source station is programmed to transmit data to its corresponding layer in the destination station. To achieve this effect, each layer of the protocol stack in the source station typically adds information (in the form of a header) to the data generated by the sending process as the data descends the stack.

For example, the internetwork layer encapsulates data presented to it by the transport layer within a packet having a network layer header. The network layer header contains, among other information, source and destination network addresses needed to complete the data transfer. The data link layer, in turn, encapsulates the packet in a frame, such as a conventional Ethernet frame, that includes a data link layer header containing information, such as MAC addresses, required to complete the data link functions. At the destination station, these encapsulated headers are stripped off one-by-one as the frame propagates up the layers of the stack until it arrives at the receiving process.

Increases in the frame/packet transfer speed of an intermediate station are typically achieved through hardware enhancements for implementing well-defined algorithms, such as bridging, switching and routing algorithms associated with the predefined protocols. Hardware implementation of such an algorithm is typically faster than software is because operations can execute in parallel more efficiently. In contrast, software implementation of the algorithm on a general-purpose processor generally performs the tasks sequentially because there is only one execution path. Parallel processing of conventional data communications algorithms is not easily implemented with general-purpose processors; yet, the flexibility afforded software implementations of highly-pipelined processors generally outweighs the processing speeds provided by hardware engine solutions implemented in application specific integrated circuits (ASIC). A problem associated with highly-pipelined general-purpose processing engines involves control of the individual processors, particularly when maintaining the order of processed frames/packets. The present invention is directed to the control and sequencing of highly-pipelined processing engines.

SUMMARY OF THE INVENTION

The present invention relates to a synchronization and control system for an arrayed processing engine adapted to process transient data within an intermediate network station of a computer network. The system comprises sequencing circuitry of an input header buffer (IHB) that controls the processing engine, which generally includes a plurality of processing elements arrayed as parallel pipelines. The novel system further includes an output header buffer (OHB) comprising circuitry for receiving transient data processed by the pipelines and for decoding control signals to determine a destination for the processed data. According to the invention, one such destination is a feedback path that couples the OHB to the IHB and returns the processed data to the IHB for immediate loading into an available pipeline.

In the illustrative embodiment, the processing elements of the engine are symmetrically arrayed as rows and columns. That is, the processing elements of each row are configured as stages of a pipeline that sequentially execute operations on the transient data loaded by the IHB, whereas the processing elements of each column operate in parallel to perform substantially the same operation on the transient data. According to an aspect of the invention, the sequencing circuitry controls the processing element stages of each pipeline by ensuring that each stage completes processing of current transient data prior to loading new transient data into the pipeline stages at a new phase. The sequencing circuitry further controls the processing element stages of each column to ensure that each stage performs its processing at a shifted phase with respect to the other columned stages, thereby substantially obviating the need for arbitration to access an external memory resource.

Advantageously, the inventive control system provides a synchronous processing engine architecture that delivers high-performance, parallel processing functions, while maintaining sequencing of data processed by the engine. Sequencing of data is a notable consideration particularly when processing frames/packets transferred within a computer network. Another advantage of the novel system is the feedback path which facilitates multicast replication of the processed data. The feedback path may be further employed to indefinitely extend any pipeline of the engine by any multiple of the pipeline stages; advantageously, this feature of the invention allows additional processing of the transient data without stalling the remaining pipelines.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
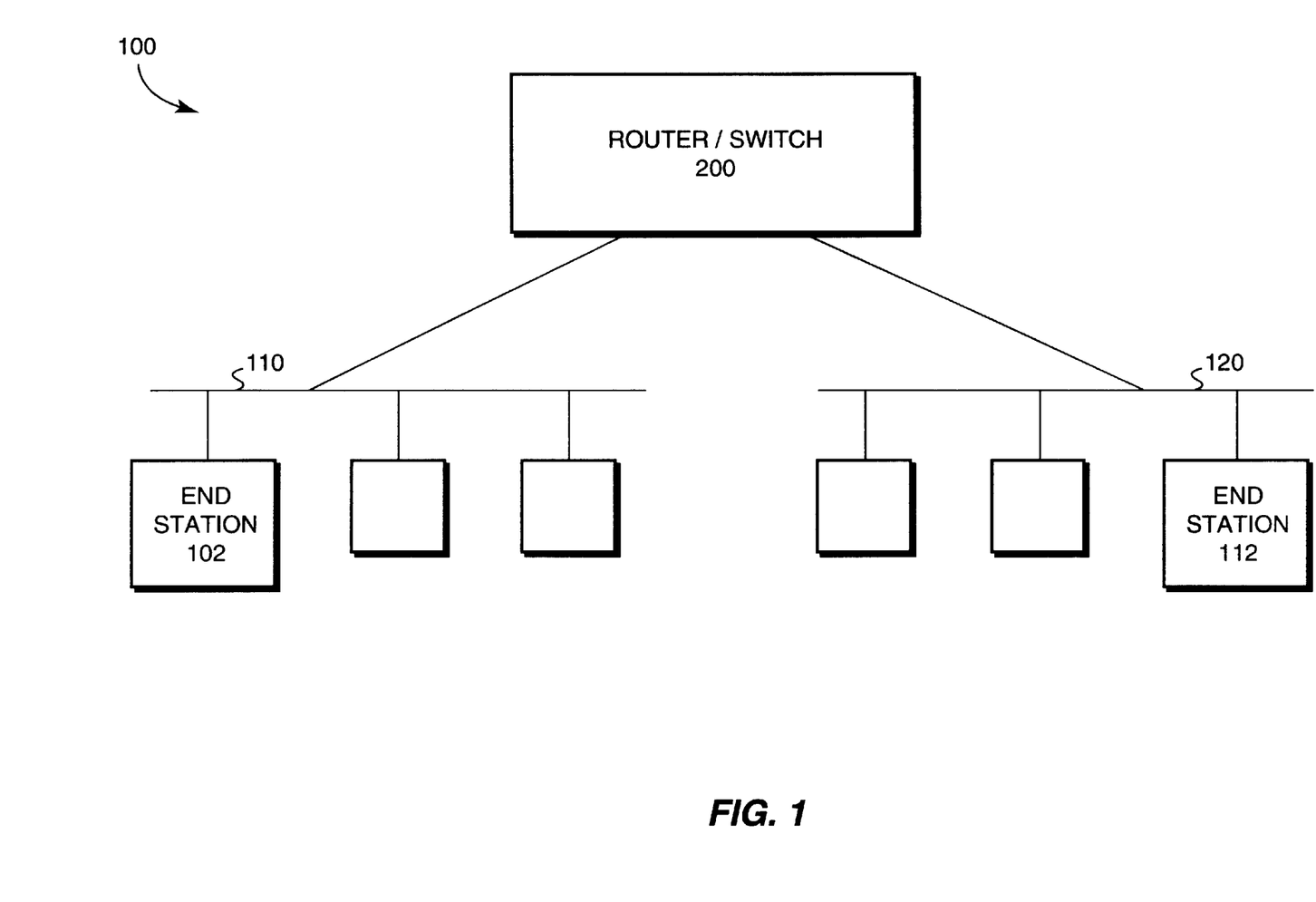
FIG. 1 is a block diagram of a computer network comprising a collection of interconnected communication media and subnetworks attached to a plurality of stations.

FIG. 1 is a block diagram of a computer network 100 comprising a collection of interconnected communication media and subnetworks attached to a plurality of stations. The stations are typically computers comprising end stations 102, 112 and intermediate station 200. The intermediate station 200 may be a router or a network switch, whereas the end stations 102, 112 may include personal computers or workstations. The subnetworks generally comprise local area networks (LANs) 110 and 120, although the invention may work advantageously with other communication media configurations such as point-to-point network links. Communication among the stations of the network is typically effected by exchanging discrete data frames or packets between the communicating nodes according to a predefined protocol. For the illustrative embodiment described herein, the predefined protocol is the Internet protocol (IP), although the invention could be implemented with other protocols, such as the Internet Packet Exchange protocol, AppleTalk protocol or DECNet protocol.

Figure 2:
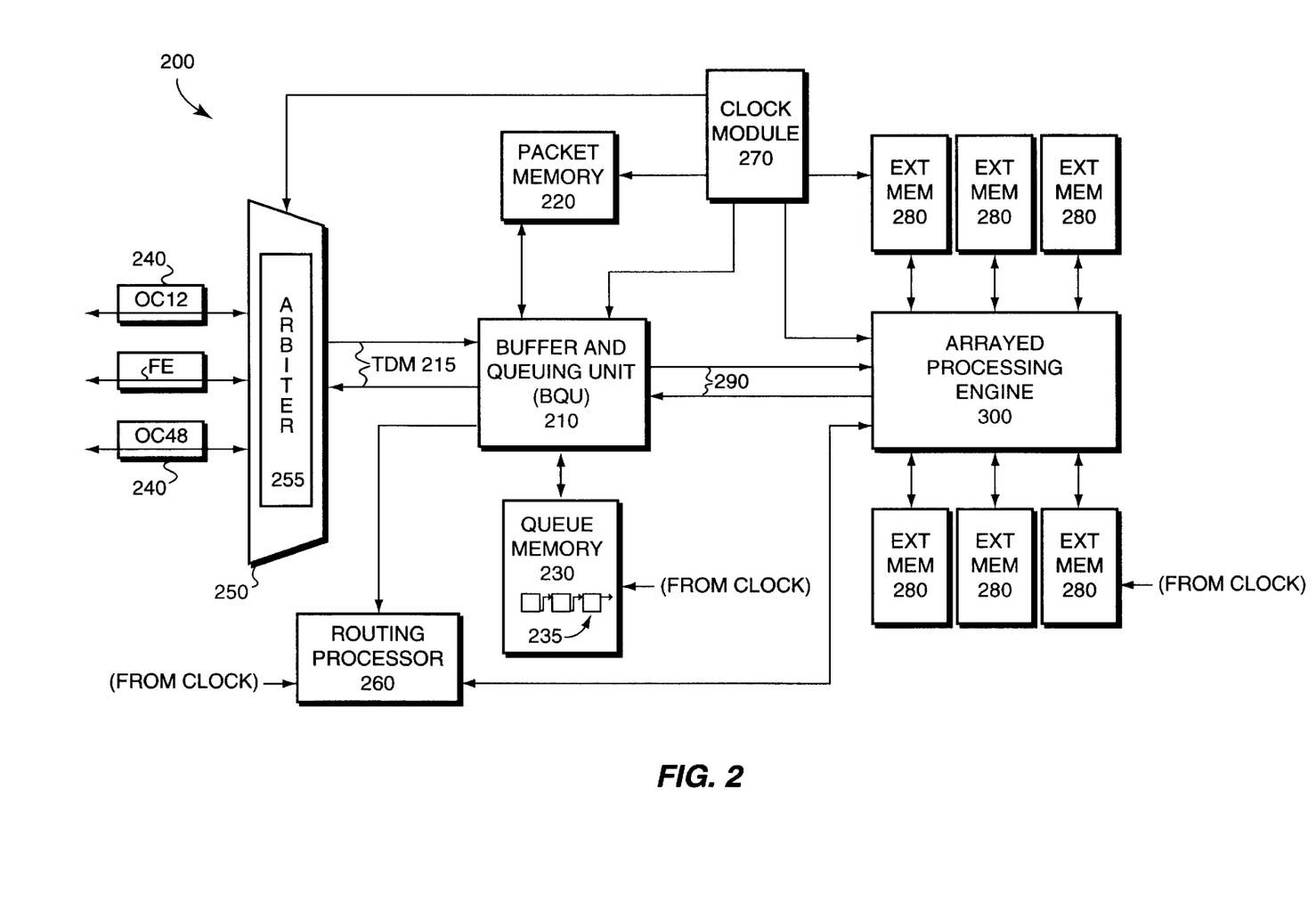
FIG. 2 is a schematic block diagram of intermediate station, such as a network switch, that may be advantageously used with the present invention.

FIG. 2 is a schematic block diagram of intermediate station 200 which, in the illustrative embodiment, is preferably a network switch. The switch generally performs layer 2 processing functions, such as "cut-through" operations wherein an entire frame does not have to be stored before transfer to a destination; in addition, switch 200 may implement layer 3 forwarding operations. It should be noted, however, that the intermediate station may also be configured as a router to perform layer 3 route processing. Thus, a feature of the intermediate station is its ability to be programmed for execution of either layer 2 and layer 3 operations. To that end, operation of the switch will be described with respect to IP switching of packets, although the switch may be programmed for other applications, such as data encryption.

The switch 200 comprises a plurality of interconnected components including an arrayed processing engine 300, various memories, queueing logic 210 and network port interface cards 240. Operations of these components are preferably synchronously controlled by a clock module 270. In the illustrative embodiment, the clock module 270 generates clock signals at a frequency of 200 megahertz (i.e., 5 nanosecond clock cycles) and globally distributes them via clock lines to the components of the switch.

The memories generally comprise random access memory (RAM) storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the operation of the switch.

The arrayed processing engine 300 is coupled to a memory partitioned into a plurality of external memory (Ext Mem) resources 280. A buffer and queuing unit (BQU) 210 is connected to a packet memory 220 for storing packets and a queue memory 230 for storing network layer headers of the packets on data structures, such as linked lists, organized as queues 235. The BQU 210 further comprises data interface circuitry for interconnecting the processing engine with a plurality of line cards 240 via a selector circuit 250. The line cards 240 may comprise OC12, OC48 and Fast Ethernet (FE) ports, each of which includes conventional interface circuitry that incorporates the signal, electrical and mechanical characteristics, and interchange circuits, needed to interface with the physical media and protocols running over that media. A typical configuration of the switch may include many (e.g., thousands) input/output channels on these interfaces, each of which is associated with at least one queue 235 in the queue memory 230. The processing engine 300 generally functions as a switching processor that modifies packets and/or headers in sequence as the BQU 210 implements queuing operations.

The BQU 210 is preferably implemented as an application specific integrated circuit (ASIC) comprising logic circuitry for implementing conventional queueing algorithms with respect to the queues located in the queue memory 230. In order to perform a queuing operation, conventional queuing logic is provided for, e.g., updating head and tail pointers to the various queues 235 in the memory 230. The BQU also contains buffers for temporarily storing packets prior to delivery to the packet memory 220 along with logic that identifies the locations of the packets in the memory 220. In addition, the BQU 210 maintains control information (e.g., time stamps, correlators) transferred to the processing engine 300 and further includes logic circuits for merging a modified header with a packet prior to forwarding the packet to the selector 250.

The selector 250 comprises an arbiter 255 that implements a fair arbitration policy to control multiplexing of data among the port channels and to synchronize data transfers over a time division multiplexed (TDM) bus 215. The arbiter 255 generally comprises registers and combinational logic configured as a sequential programmable logic circuit that directs bi-directional flow of data between the line cards and the TDM bus through the selector. Additional logic circuits (not shown) of the selector perform physical and data link network layer manipulations to convert input data into a generic form prior to multiplexing the data over the TDM bus in accordance with the arbitration policy.

For IP switching applications, the selector 250 multiplexes fixed-sized units of transient data (e.g., packets) at different rates from all of the cards 240 onto the TDM bus. The multiplexed data is provided to the BQU 210 which extracts a header from the packet prior to loading the packet into the packet memory 220. The BQU then forwards the header to the processing engine 300 over path 290 along with control information specifying the location of the packet in memory 220. Note that in other applications (such as data encryption), the entire packet may be delivered to the processing engine. In the illustrative embodiment, 128 bytes of information are forwarded to the engine, of which 64 bytes comprise a network layer (IP) header transmitted over a data portion of path 290 and the remaining 64 bytes comprise control information transferred over a control portion of the path.

The processing engine 300 processes the header information and returns a modified header which includes the address of the next "hop" station in the network along with additional control information. Illustratively, the engine returns 128 bytes of modified header (64 bytes) and additional control information (64 bytes) specifying onto which queue the modified header should be enqueued. For example, the processing engine may specify, via the control information, that the header should be loaded on a particular logical queue. The BQU then uses the control information to map (correlate) the logical queue to a physical port on a line card.

The BQU 210 generally organizes queueing operations to maintain sequencing of the packets, accomodate latency between the various input/output data rates of the interfaces, provide quality of service (priority) features and, essentially, treat packets from different IP flows differently based on certain parameters. The switch may be organized such that multiple queues of different (high, medium, low) priorities are associated with each output channel and a conventional queuing algorithm may be employed to determine from which queue 235 a packet is chosen for transmission if, e.g., there is congestion on the output channel. It should be noted, however, that the arrayed processing engine could be programmed to implement queuing operations by loading conventional queuing algorithm instructions into the engine.

The switch further comprises a route processor (RP) 260 that executes conventional routing protocols for communication directly with the processing engine 300. The routing protocols generally comprise topological information exchanges between intermediate stations to determine optimal paths through the network based on, e.g., destination IP addresses. These protocols provide information used by the RP 260 to create and maintain routing tables. The tables are loaded into the external partitioned memories 280 as forwarding information base (FIB) tables used by the processing engine to perform forwarding operations. When processing a header in accordance with IP switching, the engine 300 determines where to send the packet by indexing into the FIB using an IP address of the header. Execution of the forwarding operations results in destination media access control (MAC) addresses of the headers being rewritten by the processing engine to identify output ports for the packets.

Figure 3:
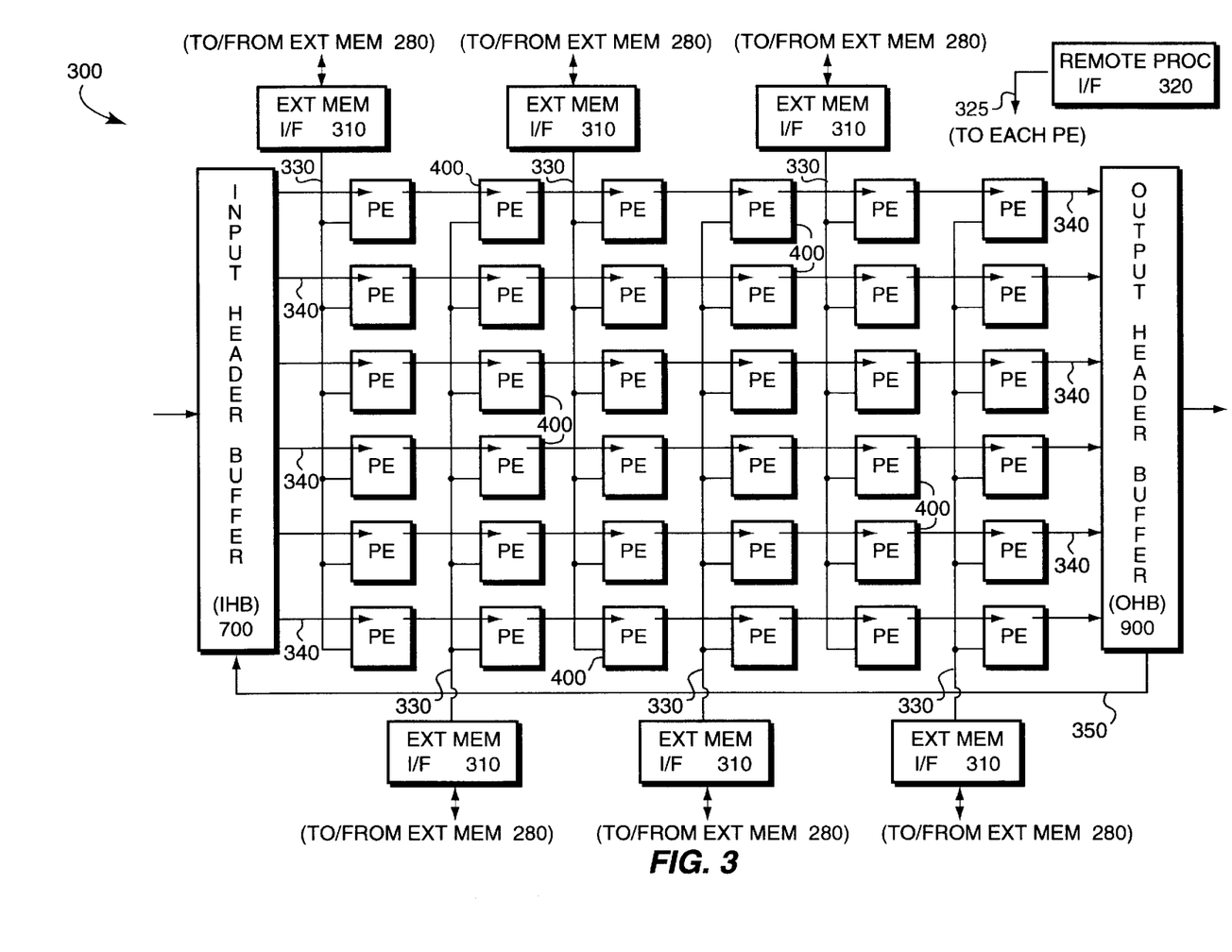
FIG. 3 is a schematic block diagram of a programmable arrayed processing engine having a plurality of processor complex elements arrayed as row and columns in accordance with the present invention.

FIG. 3 is a schematic block diagram of the programmable processing engine 300 which generally comprises an array of processing elements embedded between input and output header buffers with a plurality of interfaces from the array to an external memory. The external memory stores non-transient data organized within data structures for use in processing the transient data. The non-transient data typically includes "table" data contained in forwarding and routing tables, statistics, access filters, encryption keys and/or queuing information. Transient data enters and exists the engine via 200 MHz 128-bit input and output data interfaces of the BQU 210. Each processing element contains an instruction memory that allows programming of the array to process the transient data as baseline or extended pipelines operating in parallel. A remote processor interface (I/F) 320 provides instructions from a remote processor (not shown) to the PEs over a 32-bit maintenance bus 325 having multiplexed address/data lines for storage in their instruction memories.

In the illustrative embodiment, the processing engine 300 comprises a plurality of processing elements (PE) 400 symmetrically arrayed as six (6) rows and six (6) columns in a 6×6 arrayed configuration that is embedded between an input header buffer (IHB) 700 and an output header buffer (OHB) 900. A 64-bit feedback path 350 couples the OHB 800 to the IHB 700 and provides a data path for recycling data through the PE stages of the processing engine. The PEs of each row are configured as stages connected in series by a 100 MHz 64-bit direct memory access (DMA) data path 340 that synchronously transfers data and control "context" from one PE to the next. This arrangement enables data processing to occur as a high-level pipeline that sequentially executes operations on the transient data. The PEs of each column operate in parallel to perform substantially the same operation on that data, but with a shifted phase.

Figure 4:
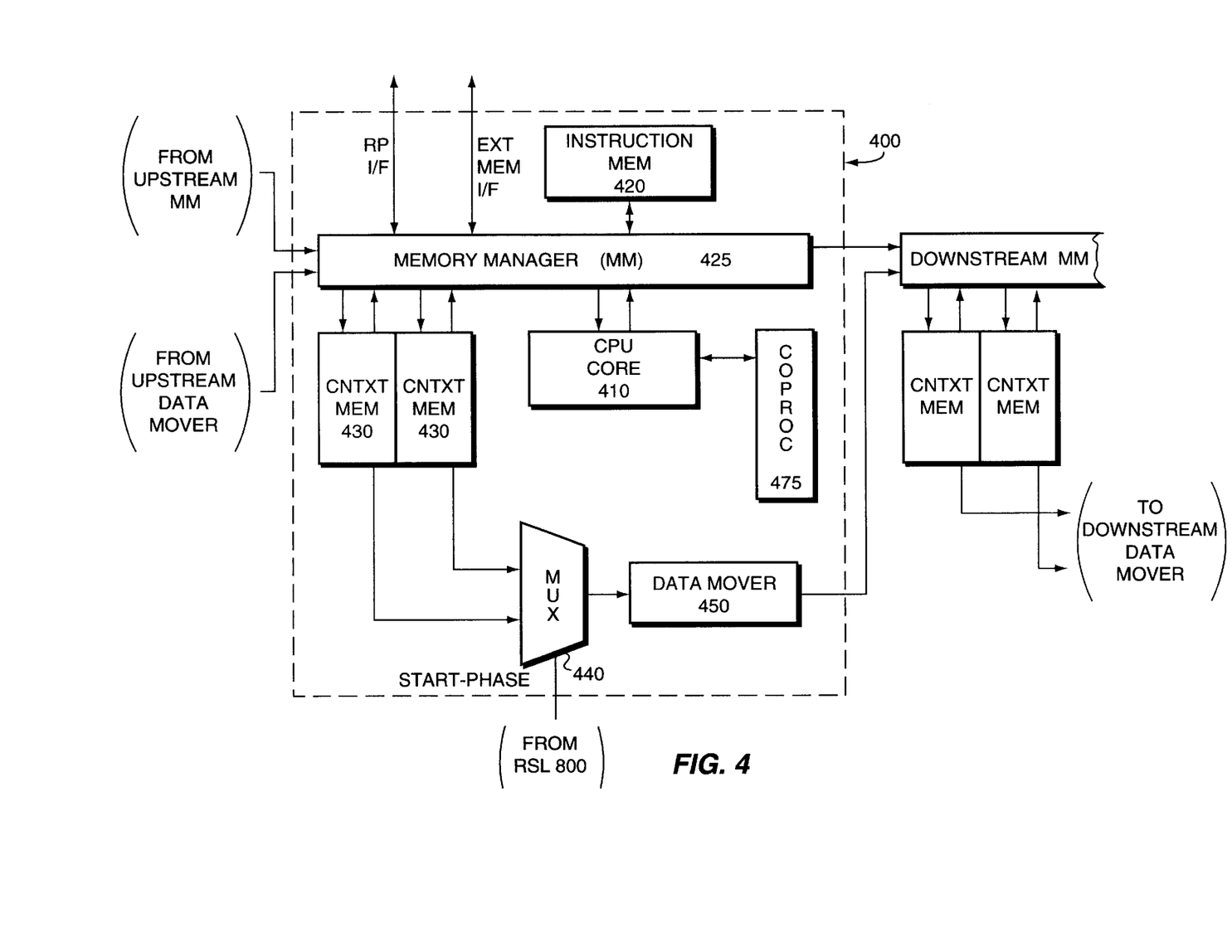
FIG. 4 is a schematic block diagram of a processor complex element.

FIG. 4 is a schematic block diagram of a PE 400. The PE is a processor complex that preferably comprises a central processing unit (CPU) core 410 coupled to an instruction memory 420 and a pair of context data memory (Cntxt Mem) structures 430 via a memory manager (MM) circuit 425. The context memories store transient "context" data for processing by the CPU core in accordance with instructions stored in the instruction memory. The MM 425 provides the instructions and data to the CPU core in response to requests for that information. The MM also provides an interface to a partitioned memory resource configured to store non-transient data, such as table data, for use by the CPU.

The architecture of the PE 400 facilitates passing of context data among the PE stages of the engine in an efficient and accurate manner. To that end, the PE 400 further comprises a data mover circuit 450 that cooperates with the context memories 430 and MM 425 to pass data among PE stages in a manner that maintains data coherency in the processing engine. The data mover generally comprises an address incrementor and interface logic, including a context size register that specifies the length of the data to be moved. An example of a processing complex element suitable for use with the present invention is described in copending and commonly-owned U.S. patent application Ser. No. (112025-79) titled Architecture for a Processor Complex of an Arrayed Pipelined Processing Engine, which application is hereby incorporated by reference as though fully set forth herein.

Because they perform similar functions, the columned PEs require similar non-transient "table" data. Therefore, the external memory is partitioned into a plurality of external memory (Ext Mem) resources, each of which is dedicated to a respective column of PEs and further configured with non-transient table data needed to support the similar function performed by the columned processor elements. Referring again to FIG. 3, each column has a dedicated 200 MHz 32-bit external memory interface data path (Ext Mem I/F) 310 for accessing the non-transient data.

Partitioning of the external memory so that each PE stage of a pipeline has exclusive access to a dedicated memory resource allows the arrayed processing engine to satisfy high bandwidth requirements of the switch. As noted, processors are typically stalled during external memory references waiting for accessed data. The processing engine architecture obviates the need for memory accesses external to the engine to retrieve transient data by storing the packet data in an internal memory of each PE. Non-transient table data, on the other hand, are stored in the partitioned external memory resources 280. Since all of the PEs in a column perform substantially the same function, only a particular type of table data is stored in each partitioned memory resource 280. For example, the FIB may be stored in a partitioned memory resource dedicated to a particular column of PEs wherein all of the processors share a single copy of the data structure. This technique provides an improvement in memory utilization and system performance over prior attempts wherein all processors of an engine access a shared memory for all types of non-transient table data. In addition, dedicating a partitioned memory resource per column significantly reduces the amount of memory required for the engine.

A memory bus 330 couples each of the columned PEs to its dedicated memory resource. Sharing of a resource, such as bus 330, typically necessitates arbitration to avoid contention among the processor elements. However, in accordance with an aspect of the invention, each of the columned PEs performs its operation at a different, staggered time with respect to the other columned PEs; therefore, each columned PE requires access to the shared resource at a different time. This type of "shifted phase" relationship between each columned PE and the dedicated resource may obviate the need for arbitration on the bus when accessing the external memory.

Figure 5:
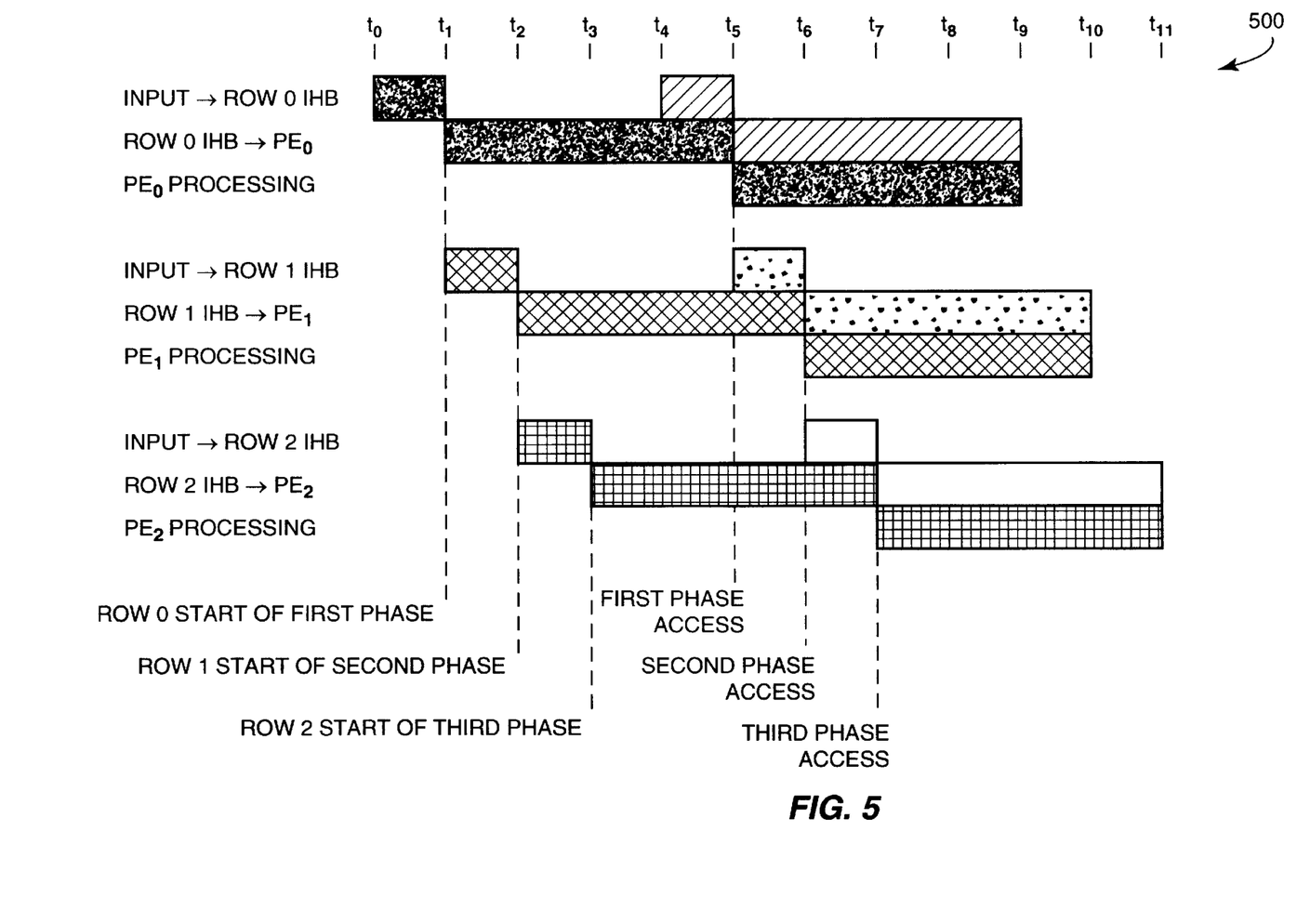
FIG. 5 is a timing diagram illustrating activity among columned processor complex elements of the programmable arrayed processing engine.

To further explain the staggered nature of activity among the PEs of a column, refer to the timing diagram 500 of FIG. 5. Time $t_0$–$t_1$ represents the amount of time needed to deliver a first packet from the input data interface to an IHB buffer for first row 0 and time $t_1$–$t_5$ is the time needed to deliver the first packet from the IHB to a first PE ($PE_0$) of row 0. Upon receiving the packet, the $PE_0$ starts processing its contents at $t_5$–$t_9$. The IHB delivers a second packet to a first PE ($PE_1$) of a second row 1 at time $t_2$–$t_6$ and $PE_1$ starts processing the packet's contents at $t_6$–$t_{10}$. As noted, $PE_0$ and $PE_1$ execute substantially the same instruction code since they are aligned in the same column. If the first instruction is a memory access operation, $PE_0$ and $PE_1$ would typically contend for the memory bus to access the memory. At time $t_5$, however, $PE_0$ performs the memory access operation while $PE_1$ receives its packet. Since these processor elements function "out-of-phase", there is no contention on the bus.

More specifically, if the IHB schedules each memory access for each columned PE on each succeeding unit of time (phase), there should be no contention for the memory resource. For example, at a first phase $PE_0$ accesses the partitioned memory, at a second phase $PE_1$ accesses the memory, and at a third phase $PE_2$ accesses the memory. This concept may be extended to any arrayed row/column configuration to ideally eliminate the need for arbitration. In a further extension of this staggered processing feature of the invention, the memory buses 330 and memory interfaces 310 preferably operate twice as fast as the PEs to enable two memory accesses per phase.

Figure 6:
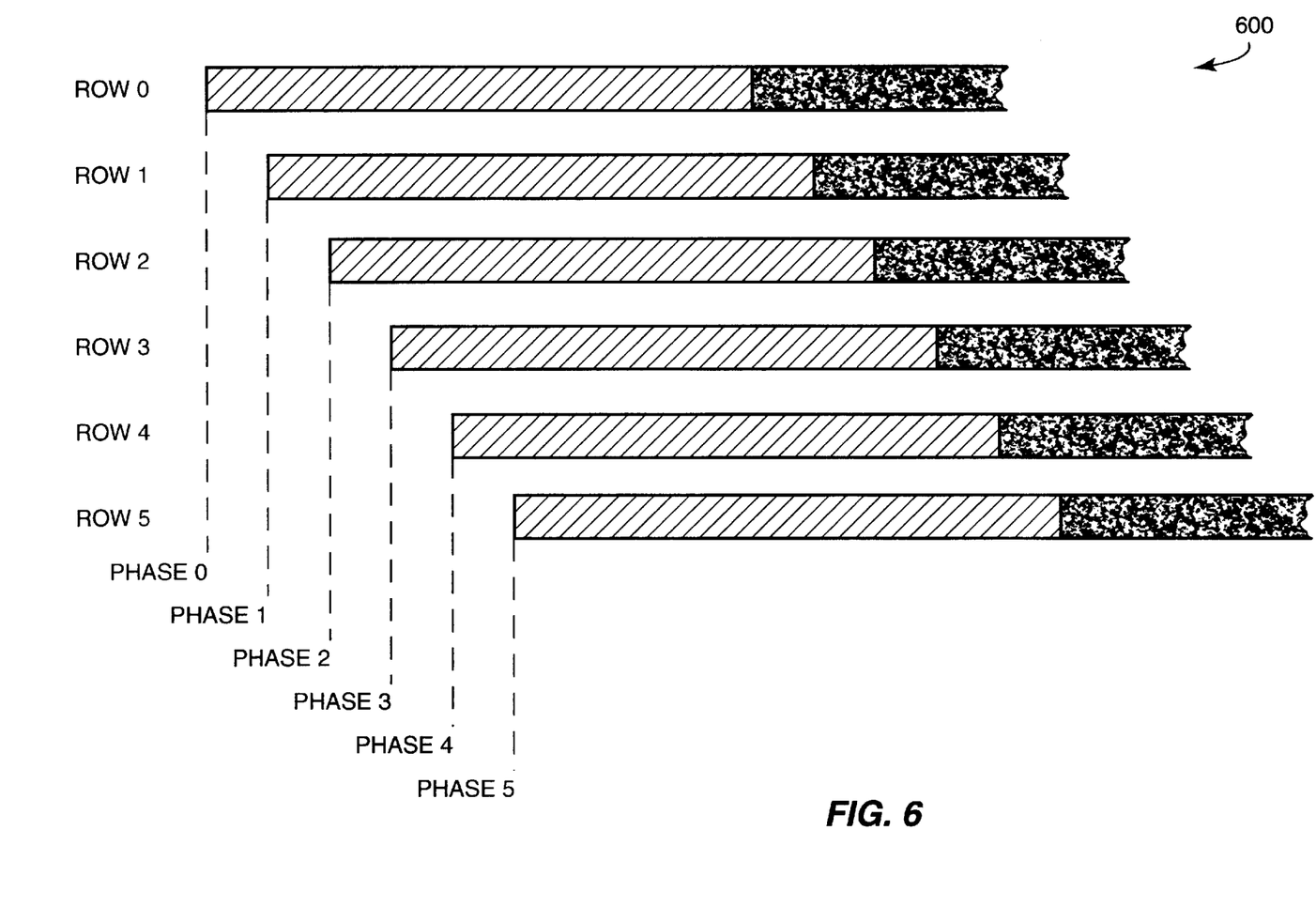
FIG. 6 is a timing diagram depicting processing by processor complex element stages of each pipeline row of the programmable arrayed processing engine.

FIG. 6 is a timing diagram 600 that depicts processing of transient data in each pipeline row of PE stages. In the illustrative embodiment of the invention, processing within each pipeline is staggered and out-of-phase with respect to adjacent pipelines. Sequencing of the pipelines and, in particular, maintaining the order of packets processed by the pipeline stages is a significant consideration in data communications. If processing is evenly divided among each of the stages of a pipeline such that each stage can perform its work within an allotted phase, then each stage finishes its processing at approximately the same time and the "pipe" advances nicely. However, if a particular stage encounters a problem that delays completion of its task within the allotted time, the remaining stages of the pipeline stall waiting for that stage to complete its task. Furthermore, the remaining pipelines of the engine that are processing subsequently-received packets also stall waiting for the delayed stage. If pipelines are allowed to advance without knowledge of the progress and status of each other, it is possible that those pipelines processing subsequently-received packets may complete prior to the pipeline processing a previously-received packet, thereby resulting in out-of-order sequencing of packets.

In FIG. 6, each line represents a pipelined row of PE stages wherein the cross-hatched portion of each line represents processing performed on a first packet loaded into each row. Once processing is finished on those packets, the solid line represents processing performed on a subsequent packet loaded into each row. As can be seen, packet processing and completion (along with the initiation of subsequent packet processing) are staggered in time. If completion of packet processing in row 2 is delayed for a period of time, then completion of packet processing in rows 3 and 4 are delayed for that period; moreover, subsequent processing of packets by the engine is commensurately delayed to maintain the order of packet sequencing. As noted, packet sequencing is a significant consideration in data communications and out-of-order completion of processing may be costly in terms of time needed to restore sequencing. The packet ordering and sequencing aspect of the invention allows implementation of the processing engine architecture with many different applications, such as asynchronous transfer mode (ATM) applications.

Figure 7:
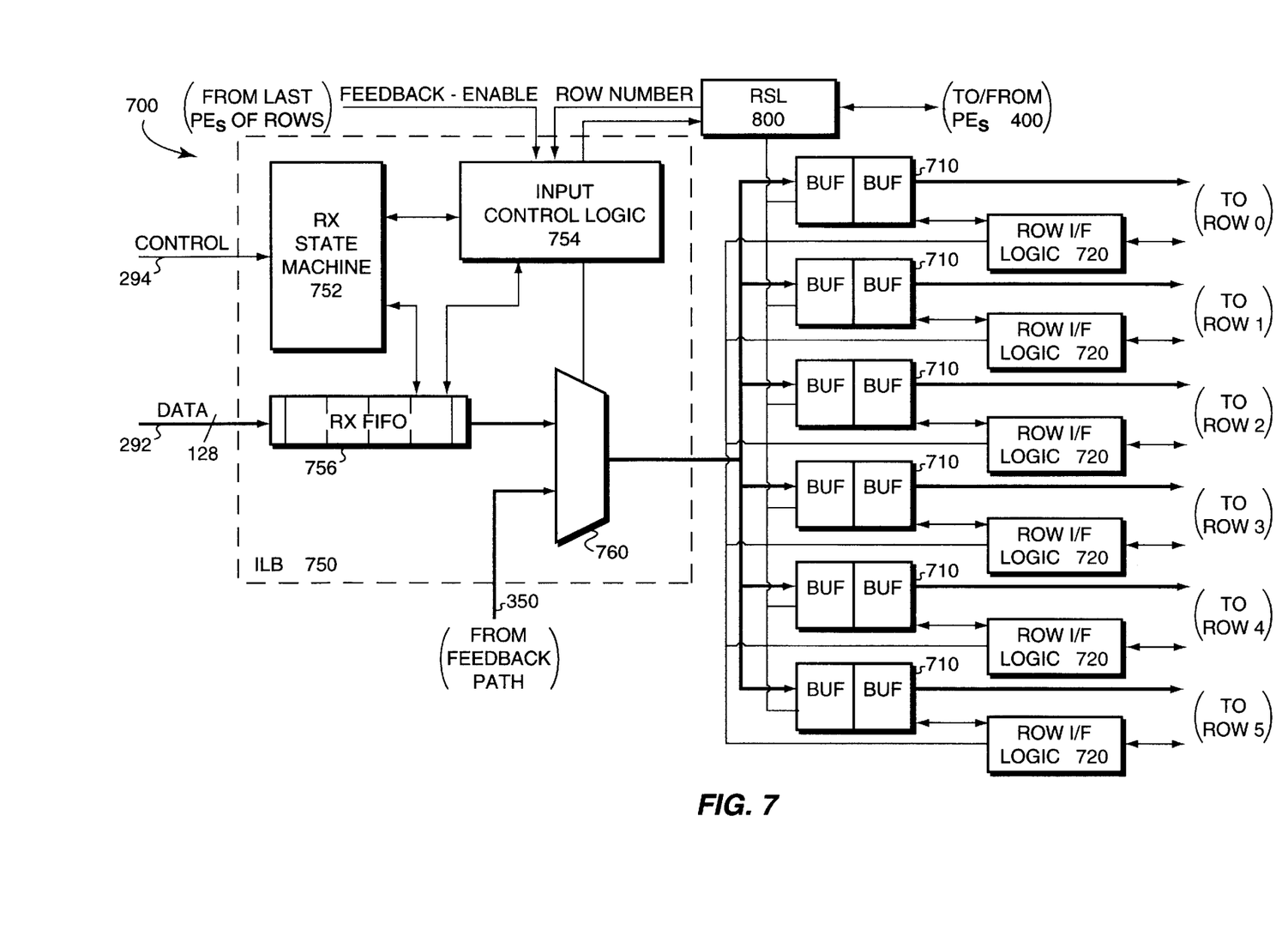
FIG. 7 is a schematic block diagram of an input header buffer (IHB) of the programmable arrayed processing engine.

FIG. 7 is a schematic block diagram of the IHB 700 which functions as a sequencer circuit to control the PE stages of the processing engine such that the columned PEs may performs their operations at staggered, shifted phases with respect to each other. To that end, a new phase for each row is started by the IHB when all of the PE stages finish processing their current "context" and new, incoming context is completely received for that row from the data interface or feedback path, and the context in the OHB for that row has been transmitted. The IHB 700 receives data context from either the data interface of the BQU 210 or from the feedback path 350 and provides the context to each pipeline in succession with feedback data context generally having priority over incoming data context. The data interface preferably includes a path 290 comprising a 128-bit data portion 292 and a control portion 294 for transferring predetermined control signals that manage the flow of data to (and from) the engine. Broadly stated, the IHB advances a pipeline row and provides a packet to a first stage of a next row in response to a completion signal from each stage of the rows. In the illustrative embodiment, all of the pipelines generally advance at the same time so that if one stage of a pipeline stalls, then all of the pipelines stall.

The IHB 700 comprises a plurality of buffer pairs (BUF 710), similar to the context memories 430 of a processor complex element 400, with each pair associated with a pipeline row. As transient data enters the engine, it is sequentially loaded into one of the paired buffers 710 for a particular row before being dispatched to a first stage of that row. The IHB presents a context-in/context-out interface (row I/F logic 720) that provides write enable, data and address signals to and from the buffers and context memories; preferably, the logic 720 is substantially identical to the data mover 450 of each PE 400. This enables the processing engine to scale efficiently, thereby allowing the pipelines to be as "deep" as desired.

The IHB also includes an input logic block (ILB 750) comprising a receive (Rx) state machine 752 coupled to an input control logic circuit 754 and an input buffer 756. The input buffer is preferably organized as a first-in, first-out (Rx FIFO) buffer that sequentially receives and transmits data forwarded to the engine by the BQU 210. The Rx state machine receives the predetermined control signals over path 294 and cooperates with the logic 754 to control the transfer of data from FIFO 756. In addition, the logic circuit 754 controls a multiplexer 760 having inputs coupled to an output of the FIFO and the feedback path 350. As described herein, the logic 754 enables the multiplexer to select one of its inputs in response to a control signal (feedback_enable) provided by the last PE stages of the pipelines. Furthermore, the logic 754 generates write enable signals (in response to a control signal provided by row synchronization logic 800) and buffer addresses that enable the row I/F logic 720 to transfer the contents of the buffers 710.

Figure 8:
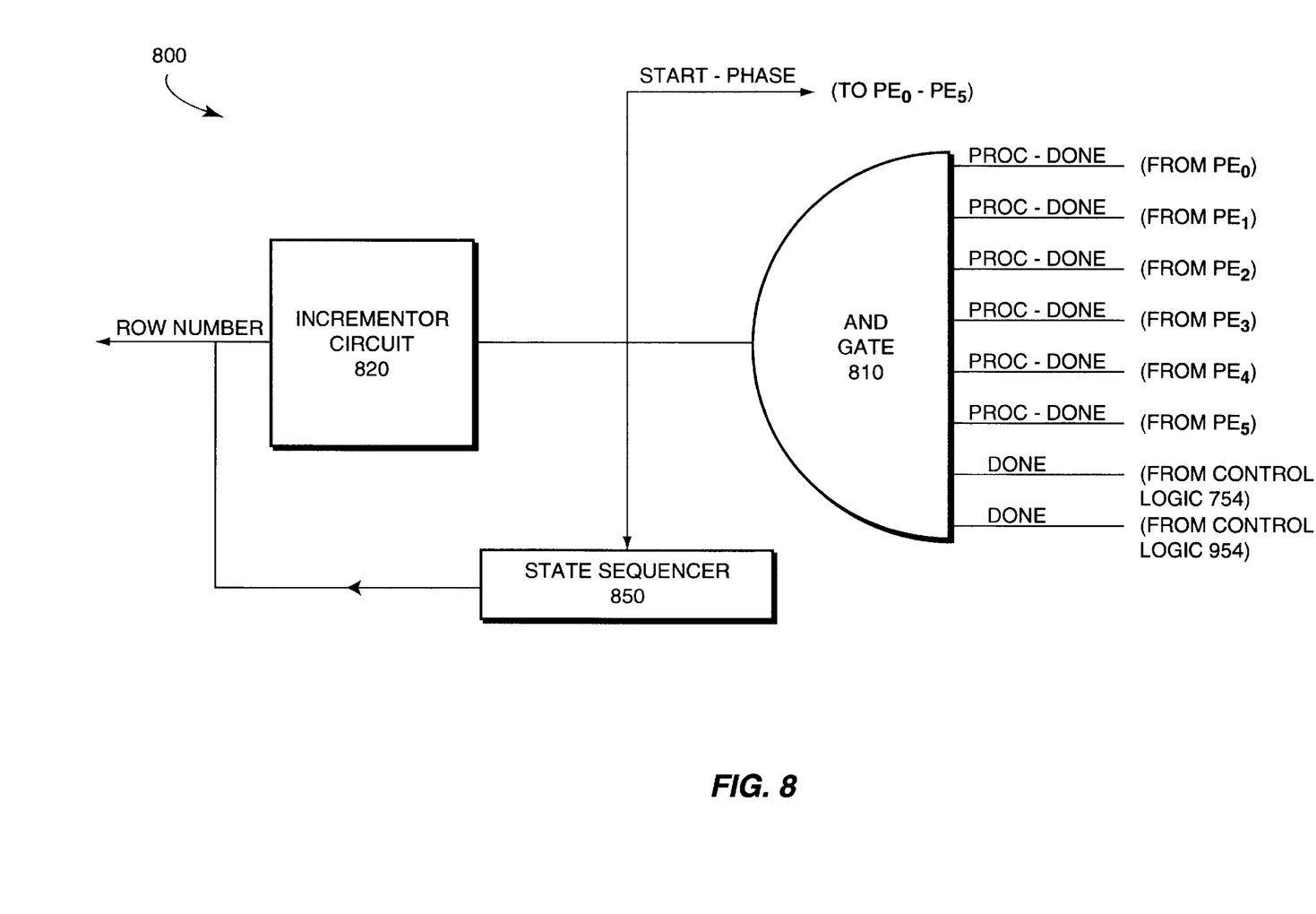
FIG. 8 is a schematic block diagram of a row synchronization logic circuit of the IHB.

FIG. 8 is a schematic block diagram of row synchronization logic (RSL) 800 that controls the pipelines by ensuring that each PE stage completes its processing of current context prior to loading new context at a new phase. To that end, the RSL comprises logic circuitry associated with each pipeline row of the arrayed processing engine. For ease of depiction, circuitry associated with one row will be described, although it will be understood to those skilled in the art that the circuitry associated with the other rows are substantially similar.

The RSL 800 receives processing completion status from each PF stage prior to advancing the pipelines. Specifically as each PE 400 finishes its task, it asserts a global pipeline completion signal (proc_done) that is collected by a logic circuit, schematically shown as an AND gate 810. Other completion signals (done) are provided as inputs to the gate from the control logic 754, 954. In response to assertion of all completion signals, the gate 810 generates a beginning of next phase signal (start_phase). The start_phase signal informs each PE stage that there is valid context data in its context memory that its CPU core can begin processing. In addition, start_phase signal is transformed by an incrementor circuit into incremented row number, while being analyzed by a state sequencer circuit 850 prior to being fed to the input control logic 754.

Operationally, transient data enters the processing engine at the IHB, where it is loaded (multiplexed) into an available pipeline row of PE stages. The start_phase signal is asserted to initiate processing by the PE stages and, when they complete, the PE stages assert proc_done signals. The proc_done signal is preferably generated by a co-processor (coproc 475 of FIG. 4) of each processor complex element in response to a context switch instruction provided by the CPU core 410. In the meantime, the ILB loads context data into a buffer 710 of a row specified by the row number and address generated by the logic 754. In the illustrative embodiment, each buffer 710 has eight (8) entries, with each entry having a length of 128 bits (8×128). The input control logic 754 includes an incrementor (not shown) that cooperates with the RSL to generate addresses and write enable signals (e.g., address 0 write_enable, address 1 write enable, address 2 write enable) to transmit the 64-bit data over the 64-bit data path 340 coupling the PE stages to the IHB. Thus, the entire contents of a buffer 710 may be transmitted via 16 data transfer operations over the data path.

After loading the context (or deciding that there is no context to load), the buffer 710 asserts the done signal provided to gate 810. Assertion of each gate input generates the start_phase signal which is provided to the state sequencer 850 and the incrementor 820, the latter of which increments the row number. The incremented row number instructs the control logic 754 to load a next row's buffer with the next context in accordance with incremented addesses provided by the control logic 754. Substantially simultaneously, the start_phase signal is provided to each of the PE stages to initiate a next processing phase for the context data loaded into the pipeline.

For the 6×6 arrayed configuration, the transient data works its way synchronously across the pipeline stages at approximately one-fourth the rate that its enters the engine. During each phase, each processing element stage of the pipeline loads the transient data into its context memories, executes programmed instructions, performs internal and external memory access (read or write) operations, as appropriate, and moves the potentially modified transient data to a next stage. When the data reaches the end of pipelined row, it may either exit the engine from the OHB and/or return to the IHB via the feedback path. As described further, a feature of the invention is the feedback path which facilitates data replication for applications such as multicast packet replication and fragmentation, as well as enables extension of a logical pipeline for more than 6 stages.

Athough in the illustrative embodiment all of the pipelines advance or stall at the same time, the state sequencer 850 may be employed to provide a "speed-up" technique that enhances this arrangement. For example if all stages of a first pipelined row complete, the sequencer may allow that pipeline to advance, whereas if a stage of the second pipelined row stalls, the sequencer prevents advancement of that pipeline (and subsequent pipelines of the engine) until each stage of the second pipelined row completes. The state sequencer 850 includes conventional circuitry for implementing a state diagram that administers advancement of the pipelines by ensuring that certain pipelines advance while others stall. This technique preserves the order of packet processing and sequencing through the processing engine.

Figure 9:
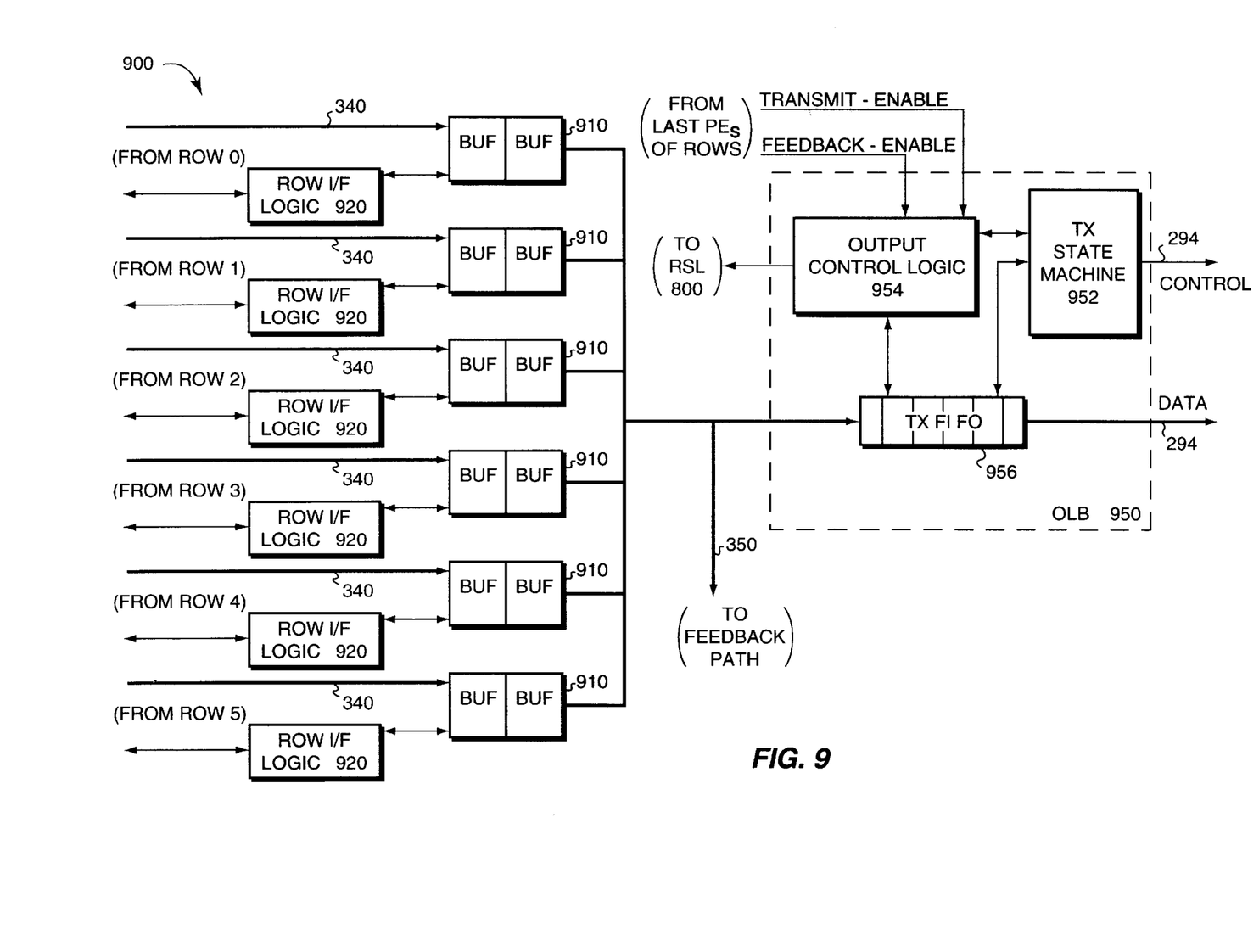
FIG. 9 is a schematic block diagram of an output header buffer of the programmable arrayed processing engine.

Upon completion of processing by all of its stages, a pipeline row is selected to deliver its data to the OHB 900 in a synchronous manner. FIG. 9 is a schematic block diagram of the OHB 900 whose internals are substantially similar as those of the IHB 700. That is, the OHB comprises a plurality of buffer pairs (BUF 910), each of which is associated with a pipeline row for receiving data processed by the row. Row I/F logic 920 provides write enable, data and address signals to and from the buffers and context memories of the PEs. In addition, the OHB includes an output logic block (OLB 950) comprising a transmit (Tx) state machine 952 coupled to an output control logic circuit 954 and an output buffer organized as a Tx FIFO 956 that sequentially transfers data from the engine to the BQU 210.

When a selected row indicates that its current data is completely processed and placed in its OHB's buffer 910, the co-processor 475 of a last PE stage in the row generates two control signals: a transmit_enable signal and a feedback_enable signal. These signals are fed to the output control logic 954 outside of the data path 340 and are decoded by the logic 954 to determine the destination of the data. For example, the two control signals <1:0> may be decoded as follows: '00'=nowhere (discard data), '01'= transmit from engine, '10'=transmit over feedback path, '11'=transmit from engine and over feedback path. If it is determined that the data will be sent outside of the engine, the data is loaded into the Tx FIFO 956 where the Tx state machine 952 sends it over the data path 292 of the data interface; otherwise, the data is fed over the feedback path 350 to the IHB 700. Note that for transmissions over the feedback path, the data arrives at the IHB in time for use by the next pipeline row during the next phase.

As noted, the feedback_enable signal is also provided to the input control logic 754 of the IHB 700 which includes logic for accomodating the feedback path 350. When asserted, the feedback_enable signal instructs the multiplexer 760 to accept the data present on the feedback path and, effectively, block the new incoming data. A feature of the feedback path 350 is the ability to extend an otherwise baseline pipeline (which, for a 6×6 array, is a 6-stage pipeline) by additional stages and, thus, enable further processing of a packet without stalling the other pipelines. Rather than being forwarded out of the OHB, the packet is wrapped around over the path 350 and loaded into another pipeline to complete processing. The feedback path can be employed to essentially create (for the 6×6 array) 6 extended pipelines. That is, any row can be extended indefinitely by any multiple of the pipeline stages (e.g., a 4 stage pipeline can be extended to 8, 12, 16 etc. stages whereas a 6-stage pipeline can be extended to 12, 18, etc. stages).

The inventive feedback aspect of the processing engine architecture also facilitates multicasting operations for packets. A multicast operation involves forwarding of multiple copies of a packet to multiple destinations. When a processed multicast packet reaches the output stage, the OHB 900 not only forwards the packet over the data path 292, but also forwards a copy of the packet over the feedback path 350 to the IHB 700. There, the packet is loaded onto an appropriate pipeline for processing. In the illustrative embodiment, a packet transferred over the feedback path has priority over other incoming packets received at the IHB. That is, a packet present on the feedback path must be accepted into a pipelined row prior to an incoming packet. The IHB "blocks" the incoming packets via conventional a flow-control mechanism, such as the multiplexer 760.

As noted, a typical application of the arrayed processing engine involves IP switching wherein the header of a packet is extracted and passed through a pipeline for processing while the entire packet including the data payload, is stored in the packet memory. However, the engine may be programmed for use in further feature processing applications, such as encryption or data compression for the entire packet. For example a conventional encryption algorithm, such as data encryption standard (DES), may be modified to accommodate the multi-staged PE pipeline where actual DES lookups are performed by the PE stages using their partitioned memory resources 280 in accordance with the programmed instructions. That is, the entire packet is apportioned and fed through the stages of the pipeline where encryption functions are performed in software. By dividing the DES tables among the various dedicated memory resources, parallelism can be invoked for such feature processing.

The programmable arrayed processing engine is scaleable such that, for each processor improvement in switching speed, the processing engine 300 can be programmed so that each processor may perform more processing on a particular context. That is, the ratio of overhead needed for passing context versus time spent processing improves which allows the solution to scale. For example, if it takes 360 processor cycles to do a particular task and there are 36 processors in the arrayed engine, the task can be divided into 10 cycles per processing stage. Note that a portion of those cycles are consumed by overhead operations associated with passing the packet context.

While there has been shown and described an illustrative embodiment of a programmable arrayed processing engine that processes transient data within an intermediate network station of a computer network, it is to be understood that various other adaptations and modifications may be made within the spirit and scope of the invention. For example, in an alternate embodiment of the invention, the processing engine architecture may comprise a single multi-stage pipeline of microcoded processing elements (PE) with an external memory partitioned among groups of PE stages. Since external memory references are more expensive than CPU cycles, this embodiment realizes the same memory efficiency as the row/column arrayed processing engine configuration, yet with easier software development design and support.

Figure 10:
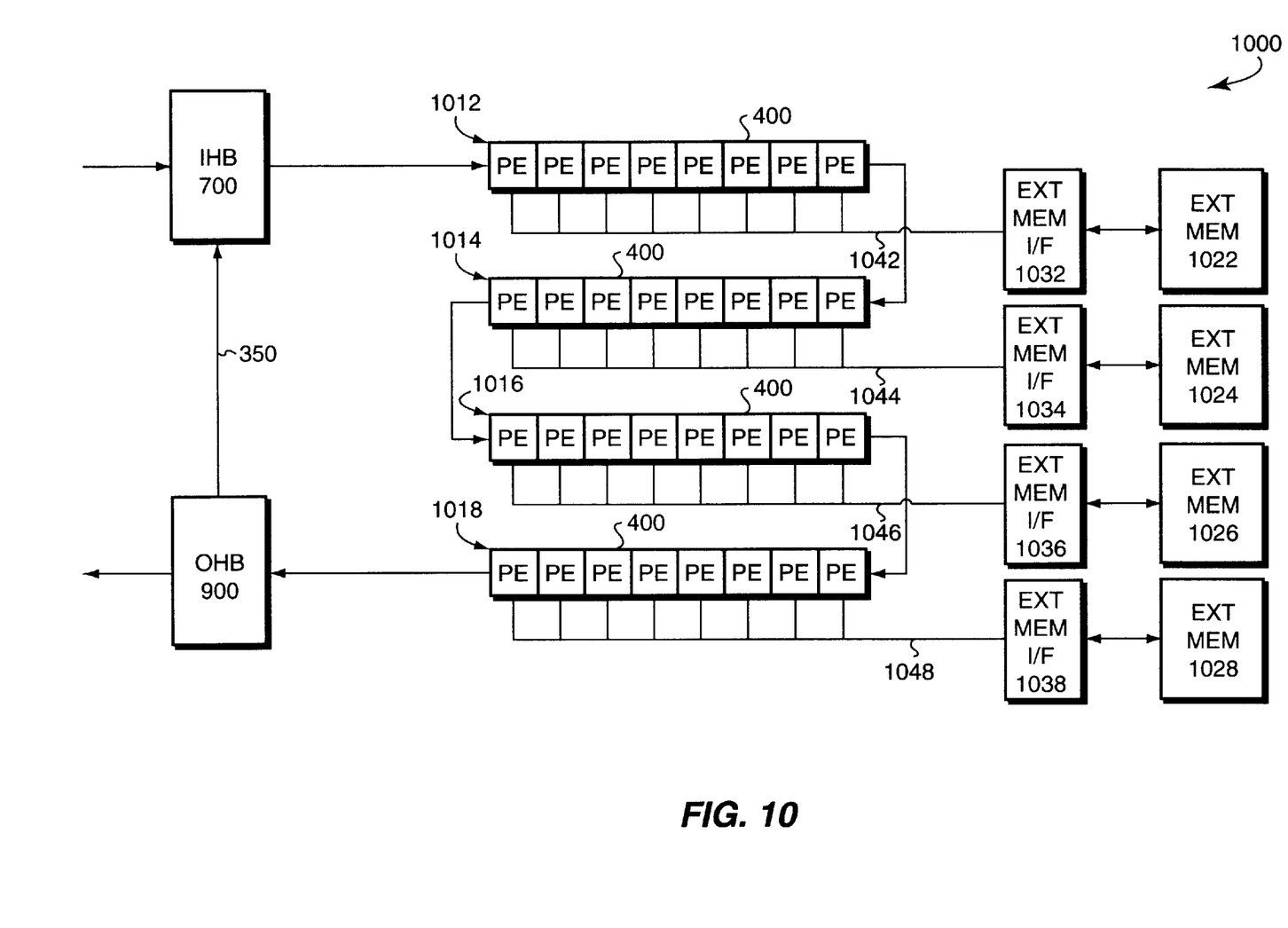
FIG. 10 is a schematic block diagram of an alternate embodiment of the programmable arrayed processing engine according to the present invention.

FIG. 10 is a schematic block diagram of an alternate embodiment of the arrayed processing engine 1000 wherein the external memory is partitioned into resources 1022–1028, each of which is dedicated (exclusively accessible) to a respective group of PEs 1012–1018 via external memory interface circuits 1032–1038. Transient data enters the engine through IHB 700 and exists through OHB 900 unless the data is recirculated through the pipeline over feedback path 350. Each partitioned external memory resource is configured with non-transient data structures so that various processing functions may be apportioned among the PE stages 400.

As with the illustrative embodiment, each PE stage is programmed to perform a task on transient data which is passed (and stored) among the stages. In this embodiment, all PEs of a group may access their memory resource simultaneously over a respective bus 1042–1048; to ensure efficiency and alleviate contention for the resource, instruction sequencing may be manipulated to effectively interleave memory accesses among the stages. Although it is is limited to processing one packet at a time through the pipeline, this embodiment provides an increase in memory bandwidth over previous approaches having a memory shared by all processing elements of the engine.

In summary, the invention described herein advantageously provides a synchronous processing engine architecture that delivers high-performance, parallel processing functions, while maintaining sequencing of data processed by the engine. As noted, sequencing and ordering of data is a significant consideration when processing data packets within a data communications environment. Another advantage of the synchronization and control system is the ability to efficiently perform multicast replication of the processed data using the novel feedback path. The feedback path may be further employed to indefinitely extend any pipeline of the engine by any multiple of the pipeline stages; advantageously, this feature of the invention allows additional processing of the transient data without stalling the remaining pipelines.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system for synchronously controlling a processing engine adapted to process transient data, the system comprising:

a plurality of processing elements symmetrically arrayed as pipeline rows and columns, the processing elements of each row configured as stages of a pipeline that sequentially execute operations on the transient data and the processing elements of each column operating in parallel to perform substantially the same operation on the transient data;

an external memory partitioned into a plurality of memory resources, each partitioned resource dedicated to a respective column of processing element stages; and an input header buffer (IHB) configured to load the transient data into an available pipeline for processing, the IHB comprising input sequencing circuitry that controls the processing element stages of each pipeline row by ensuring that each stage completes processing of current transient data prior to loading new transient data into the stages at a new phase, the input sequencing circuitry further controlling the processing element stages of each column to ensure that each stage performs its processing at a shifted phase with respect to the other columned stages, thereby substantially obviating the need for arbitration to access the partitioned memory resource.

2. The system of claim 1 further comprising an output header buffer (OHB) having output circuitry for receiving the current transient data processed by the pipeline rows of processing element stages and for decoding control signals to determine a destination for the processed data.

3. The system of claim 2 wherein the input sequencing circuitry comprises a logic circuit configured to generate a new phase signal in response to receiving completion signals from the IHB, the OHB and the processing elements upon completion of their operations on the transient data.

4. The system of claim 3 wherein the logic circuit is AND gate and wherein the new phase signal is a start_phase signal that informs each processing element stage that the new transient data loaded into the stage is valid and available for processing during the new phase.

5. The system of claim 4 wherein the control signals includes a transmit_enable signal and a feedback_enable signal, and wherein the output circuitry comprises output control logic that decodes the signals to determine the destination of the processed data.

6. The system of claim 5 wherein the input sequencing circuitry and the output circuity comprise a plurality of buffer pairs, each associated with a pipeline row, each input buffer pair of the input sequencing circuitry configured to store and dispatch the transient data to a first stage of an associated pipeline row, and each output buffer pair of the output circuitry configured to receive and store transient data processed by an associated pipeline row.

7. The system of claim 6 wherein the input sequencing circuitry further comprises an incrementor circuit coupled to input control logic, the incrementor circuit transforming the start_phase signal into incremented row number that instructs the input control logic to load a next buffer pair of the input sequencing circuitry with transient data.

8. The system of claim 7 wherein the input sequencing circuitry further comprises a state sequencer circuit that administers advancement of the pipelines.

9. The system of claim 6 wherein the input sequencing circuitry further comprises an input buffer circuit that receives transient data provided to the processing engine.

10. The system of claim 9 wherein the input buffer circuit is a first-in, first-out (FIFO) buffer that sequentially transmits the received transient data.

11. The system of claim 10 wherein the input sequencing circuitry further comprises a receive state machine cooperatively coupled to the input control logic and the FIFO to control transfer of the received transient data from the FIFO.

12. The system of claim 11 further comprising a feedback path coupling the OHB to the IHB, the feedback path returning the transient data from the OHB to the IHB for loading into an available pipeline to enable further processing of the transient data without stalling the remaining pipelines.

13. The system of claim 12 wherein the feedback path operates to enable one of replication of the returned transient data and extension of a selected pipeline by additional stages.

14. The system of claim 12 wherein the input sequencing circuitry further comprises a multiplexer having inputs coupled to an output of the FIFO and the feedback path, the multiplexer further having an output coupled the input buffer pairs, the multiplexer controlled by the input control logic to select one of the inputs in response to the feedback_enable signal to enable loading of one of the received transient data and the returned transient data into a selected one of the input buffer pairs.

15. A method for synchronously controlling a processing engine adapted to process transient data, the method comprising the steps of:

symmetrically arraying a plurality of processing elements as pipeline rows and columns, each row comprising processing element stages of a pipeline that sequentially execute operations on the transient data and each column comprising processing elements that operate in parallel to perform substantially the same operation on the transient data;

partitioning an external memory into a plurality of memory resources and dedicating each partitioned resource to a respective column of processing element stages; and controlling the processing element stages (i) of each pipeline row to ensure completion of processing of current transient data by each stage prior to loading new transient data into the stages at a new phase and (ii) of each column to ensure that each stage performs its processing at a shifted phase with respect to the other columned stages, the pipeline rows and columns controlled by input sequencing circuitry of an input header buffer (IHB).

16. The method of claim 15 further comprising the steps of:

receiving the current transient data processed by the pipeline rows of processing element stages at output circuitry of an output header buffer (OHB); and decoding control signals at the output circuitry to determine a destination for the processed transient data.

17. The method of claim 16 further comprising the step of coupling the OHB to the IHB using a feedback path, the feedback path returning the processed transient data from the OHB to the IHB for loading into an available pipeline row to enable further processing of the transient data without stalling the remaining pipeline rows.

18. The method of claim 17 further comprising the steps of, wherein the input sequencing circuitry comprises a plurality of input buffer pairs and the output circuity comprises a plurality of output buffer pairs, each buffer pair associated with a pipeline row:

loading the new transient data into one of the input buffer pairs associated with an available pipeline row;

dispatching the transient data from the input buffer pair to a first stage of the associated pipeline row;

loading the processed transient data into one of the output buffer pairs from an associated pipeline row; and one of (i) returning the processed transient data to the IHB over the feedback path and (ii) transmitting the processed transient data from the engine.

19. The method of claim 16 further comprising the step of generating a new phase signal at the input sequencing circuitry in response to receiving completion signals from the IHB, the OHB and the processing elements upon completion of their operations on the transient data.

20. The method of claim 17 further comprising the steps of, wherein one of the control signals is a feedback_enable signal and wherein the input sequencing circuitry further comprises an input buffer circuit that sequentially receives transient data provided to the processing engine, coupling an output of the input buffer circuit and the feedback path to inputs of a multiplexer;

coupling an output of the multiplexer to the input buffer pairs; and selecting one of the inputs to load one of the received transient data and the returned transient data into an input buffer pair in response to the feedback_enable signal.

* * * * *